(12) United States Patent
Cai et al.

(10) Patent No.: US 7,100,060 B2
(45) Date of Patent: Aug. 29, 2006

(54) TECHNIQUES FOR UTILIZATION OF ASYMMETRIC SECONDARY PROCESSING RESOURCES

(75) Inventors: Zhong-Ning Cai, Austin, TX (US); Chee How Lim, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 416 days.

(21) Appl. No.: 10/184,557

(22) Filed: Jun. 26, 2002

(65) Prior Publication Data
US 2004/0003309 A1 Jan. 1, 2004

(51) Int. Cl.
*G06F 1/32* (2006.01)

(52) U.S. Cl. .................. 713/320; 713/322; 713/323

(58) Field of Classification Search ........... 713/300, 713/320, 322, 323; 712/1, 200, 205, 208
See application file for complete search history.

(56) References Cited

U.S. PATENT DOCUMENTS

| | | | | |
|---|---|---|---|---|
| 5,142,684 A | * | 8/1992 | Perry et al. | 713/320 |
| 5,537,656 A | * | 7/1996 | Mozdzen et al. | 713/323 |
| 5,754,869 A | * | 5/1998 | Holzhammer et al. | 713/300 |
| 6,058,466 A | * | 5/2000 | Panwar et al. | 712/15 |
| 6,182,232 B1 | * | 1/2001 | Klein | 713/340 |
| 6,240,521 B1 | * | 5/2001 | Barber et al. | 713/323 |
| 6,289,465 B1 | * | 9/2001 | Kuemerle | 713/300 |
| 6,615,366 B1 | * | 9/2003 | Grochowski et al. | 714/10 |
| 6,725,354 B1 | * | 4/2004 | Kahle et al. | 712/34 |

OTHER PUBLICATIONS

Hennessy John L. et al, Computer Organization and Design: The Hardware/Software Interface, 1998, Morgan Kaufmann Publishers, 2nd Ed., pp. 434-440, 449455, 510-516.*
Seng John S et al., Reducing Power with Dynamic Critical Path Information, Dec. 2001, University of California.*
Lim, Chee How, "High-Performance Microprocessor Design Under Thermal Constraints," Dissertation submitted to Portland State University, Apr. 26, 2002.
Lim, Chee How; Daasch, W. Robert; Cai, George, "A Thermal-Aware Superscalar Microprocessor (Architecture-Level Tradeoff)," Integrated Circuit Design and Test Laboratory, Portland State University; Intel Corporation, Mar. 20, 2002, 18 pages.

* cited by examiner

*Primary Examiner*—Chun Cao
*Assistant Examiner*—Mark Connolly
(74) *Attorney, Agent, or Firm*—Blakely, Sokoloff, Taylor & Zafman LLP

(57) ABSTRACT

A processor having asymmetric secondary processing resources. One disclosed embodiment includes a first execution resource to perform a first function and a second execution resource that also performs the second function, although the second processing resource is asymmetric to the first resource in that it has a lower throughput than the first processing resource. Switching logic switches execution from the first processing resource to the second processing resource in a reduced power consumption mode.

46 Claims, 6 Drawing Sheets

TECHNIQUES FOR UTILIZATION OF ASYMMETRIC SECONDARY PROCESSING RESOURCES

BACKGROUND

1. Field

The present disclosure pertains to the field of processing systems, and particularly the use of a secondary processing resource to execute instructions under some conditions.

2. Description of Related Art

Several techniques are presently used to control temperature and power consumption of electronic components such as processors. Typically, maintaining a temperature of a component at an acceptable level is important to avoid damaging the component as well as to ensure safety. On e way to control or reduce temperature is to limit power consumption. Additionally, with the popularity of mobile computing and communications devices, limiting power consumption to preserve battery life is an increasingly important goal as well. Thus, power conservation may be advantageous to limit heat generation, to preserve battery power, or both.

Dynamic clock disabling is one prior art technique to reduce power consumption. Dynamic clock disabling is the temporary or intermittent stopping of the clock or clocks of a processor. During the period in which the clock is stopped, clearly less power is consumed; however, no work can be performed if all of the clocks are stopped. In some cases, a reduced level of functionality may be provided by periodically stopping clocks; however, during "on" periods large and power-hungry high performance logic structures are used. Another variation is to recognize when there is no work to be done, and to stop the clocks at that point in time. Another variation is to stop clocks to a particular functional unit (e.g., a floating point unit) when that unit is idle. However, when a unit or processor is idled, no work is accomplished.

Dynamic frequency scaling is the change of processing frequency, typically effectuated by altering a clock frequency of the processor. While reduction of operating frequency decreases power proportionately, dynamic frequency scaling may in some cases require that a phase locked loop re-acquire lock, which can be a relatively time consuming proposition. Moreover, dynamic frequency scaling also still keeps large power-hungry structures active.

BRIEF DESCRIPTION OF THE FIGURES

The present invention is illustrated by way of example and not limitation in the Figures of the accompanying drawings.

DETAILED DESCRIPTION

The following description discloses a processing system having asymmetric secondary processing resources. In the following description, numerous specific details are set forth in order to provide a more thorough understanding of the present invention. It will be appreciated, however, by one skilled in the art that the invention may be practiced without such specific details. In other instances, control structures and gate level circuits have not been shown in detail in order not to obscure the invention. Those of ordinary skill in the art, with the included descriptions, will be able to implement appropriate logic circuits without undue experimentation.

Distribution of processing activity across asymmetric resources may be advantageous in a number of ways. Some embodiments may allow new low power but 'awake' modes that might not otherwise be possible. Some embodiments provide a secondary processing resource without the large area increase associated with fully duplicating resources. Moreover, some embodiments can provide a processor that operates to reduce power consumption or reduce temperature without requiring other system hardware or software changes, although hardware and/or software changes may prove advantageous in some embodiments.

Figure 1:
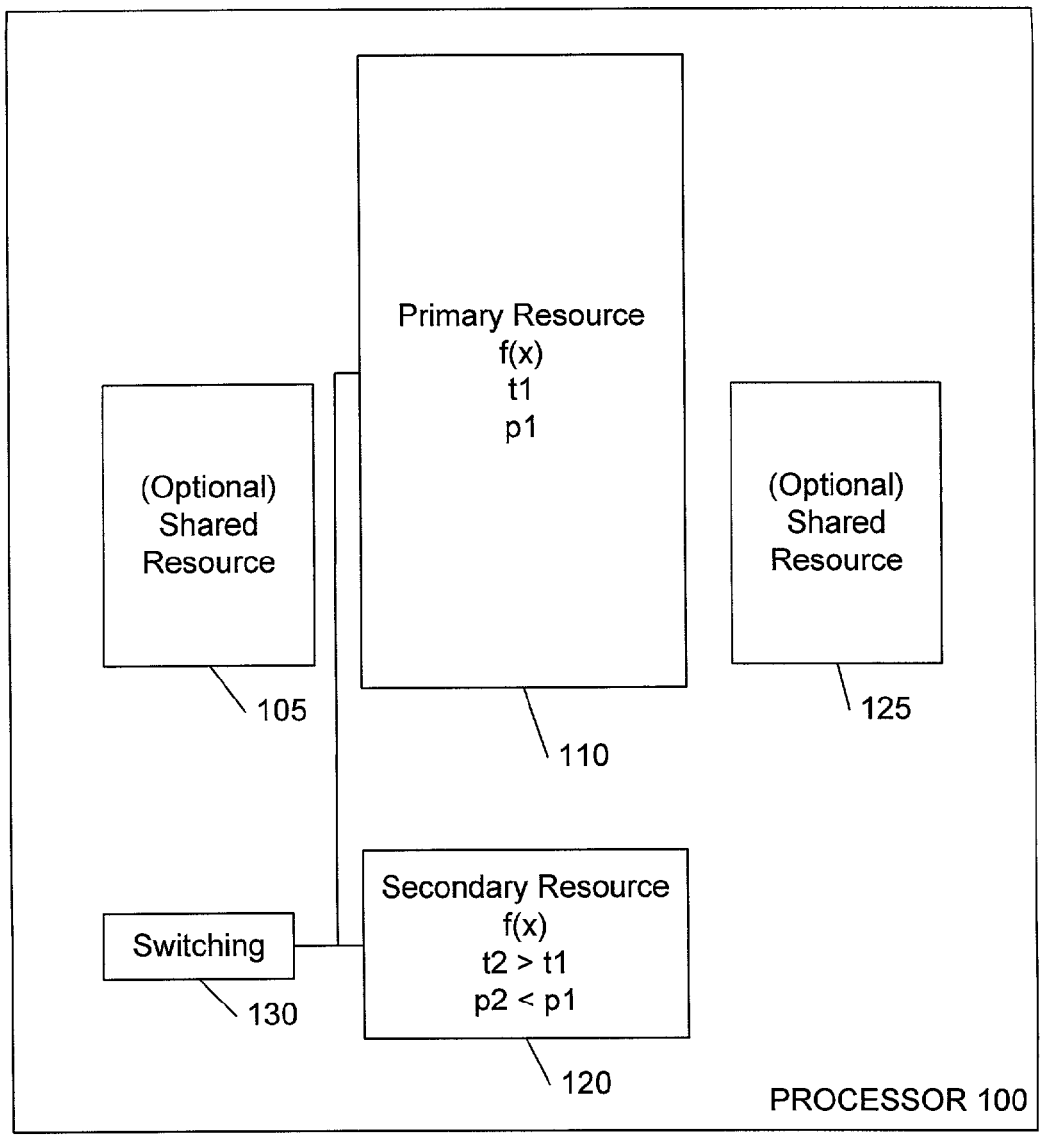
FIG. 1 illustrates one embodiment of a processor utilizing an asymmetric secondary processing resource.

For example, in the embodiment of FIG. 1, a processor 100 may distribute processing between a primary resource 110 and a secondary resource 120. In the embodiment of FIG. 1, the primary resource 110 is a relatively large and performance-oriented resource, that performs the function $f(x)$ relatively rapidly, in a period of t1, and consuming a power p1. It is relatively expensive in terms of power consumption to use the primary resource 110 to perform the function $f(x)$, but in general performance is desired. Moreover, the use of the primary resource 110 to perform the function $f(x)$ typically generates more heat.

The secondary resource 120 also performs the function $f(x)$; however, the secondary resource is asymmetric with respect to the primary resource in terms of its throughput, size, and power consumption. The secondary resource may be asymmetric with respect to any one or more of these characteristics, but they typically are correlated and all change together. Because the secondary resource need not achieve as high of throughput as the primary resource 110, the secondary resource 120 is typically smaller in size and consumes less power than the primary resource 110. Thus, as indicated in FIG. 1, the secondary resource 120 performs the function $f(x)$ in a second amount of time, t2, which is greater than t1, and using a second amount of power p2, which is less than p1.

While the primary and secondary resources of FIG. 1 are at least partially functionally duplicative because they both perform the function $f(x)$, they need not be fully duplicative in functionality. In some embodiments, the secondary resource 120 may implement only a subset of the total functionality of the primary resource 110. In other embodiments, however, the primary and secondary resources may be full functional substitutes for one another, allowing equivalent operation, except for the time and power consumed.

The embodiment of FIG. 1 optionally also includes two sets of shared resources 105 and 125. In some embodiments, post and/or pre-processing logic may be shared between primary and secondary resources. Therefore shared resources may be used, but are not required. Additionally, the embodiment of FIG. 1 includes switching logic 130. The switching logic triggers a switch in processing resources. In one embodiment, the switching logic 130 may move processing of the function ƒ(x) from exclusively being performed by the primary resource 110 to exclusively being performed by the secondary resource 120. In another embodiment, however, processing may be performed by the primary resource 110 and the secondary resource 120 in a high throughput and/or high power mode, and then scaled back to just one resource (e.g., first to exclusively the primary resource 110) and then to the lowest power resource (e.g., secondly to only the secondary resource 120).

Various permutations of reduced power modes and processing resources may be used. For example, additional increments of processing resources may be provided between the highest and lowest power resources, with different combinations of resources being active in order to maintain some reasonable throughput on a reasonable power budget under the circumstances. For example, N different copies of a particular functional unit or function may be provided, each having a different power consumption and a different throughput. A power aware scheduler may schedule instruction dispatch not only seeking to minimize throughput, but also to stay within a certain total power consumption, or based on a current die temperature. Thus, various ones of the N resources may be selected for execution of a particular function at a particular time based on the power allotted or the current thermal environment.

In one embodiment, the processor 100 is a thermally aware microprocessor. The thermally aware microprocessor may scale back its power consumption yet still continue processing at a steady pace by switching to its lower throughput set of resources. In some embodiments, the processor switches to its lower throughput resources with little disruption by draining instructions utilizing the high performance and high power resources, and then initiating execution using the secondary resource. Such switching may be performed without stopping a clock or re-synchronizing a phase locked loop in some cases. Moreover, by using such hardware mechanisms, the thermally aware microprocessor may achieve power conservation and/or cooling without external intervention and without any software support in some embodiments. Furthermore, with multiple resources spreading out heat generation, less expensive heat dissipation technologies may be used to cool the processor 100 in some cases.

A prior art processor may be more prone to overheating since a single set of resources may be continuously active. As a result of an overheating event, a disruptive cooling period (e.g., stopping or reducing frequency of clocks) may be triggered according to prior art techniques, causing the processor to operate very slowly and/or need to re-lock phase locked loops. Thus, an overheating period may degrade performance significantly. In a thermally aware processor, the addition of secondary processing resources may consume a small amount of processor area (e.g., area on a silicon die in some embodiments); however, the additional area may be performance justified by allowing the processor to operate more coolly and avoid disruptive cooling periods. For example, in one embodiment, five percent of die area may be dedicated to providing functionally duplicative structures that allow a lower yet continuous execution rate. Clocks may be gated to the large functionally duplicated structures, thereby eliminating the need to change frequency and re-synchronize a phase locked loop. Thus, overall the obtained energy to performance ratio may readily justify the expense in consumed die area in some cases.

Moreover, transistor reliability decreases and leakage current increases as temperature rises. These generally negative effects may be mitigated if lower processor temperatures are obtained by spreading processing to the secondary processing resources to reduce heat concentration. Since leakage current becomes a larger concern as device geometries shrink, keeping device temperature low should continue to be an important factor in reducing leakage current. Therefore, it may be desirable to locate the functionally duplicative processing resources far away from the resources which they are functionally duplicating to maximize thermal de-coupling. The desire to thermally de-couple these resources, however, typically will need to be tempered by the long signal lines (and hence delay) that might be introduced in embodiments in which the functionally duplicated resources interact substantially with a set of shared resources.

While a general purpose microprocessor may be one beneficiary of the use of asymmetric secondary resources to perform processing in some cases, other types of devices may benefit as well. For example, the processor 100 may be any type of processor such as a graphics processor, a network processor, a communications processor, a system-on-a-chip processor, an embedded processor, a digital signal processor or any other known or otherwise available component which performs processing. Moreover, other electronic components that generate heat and are capable of operating at different throughput and power levels may likewise benefit from using a secondary asymmetric resource at some times.

Figure 2:
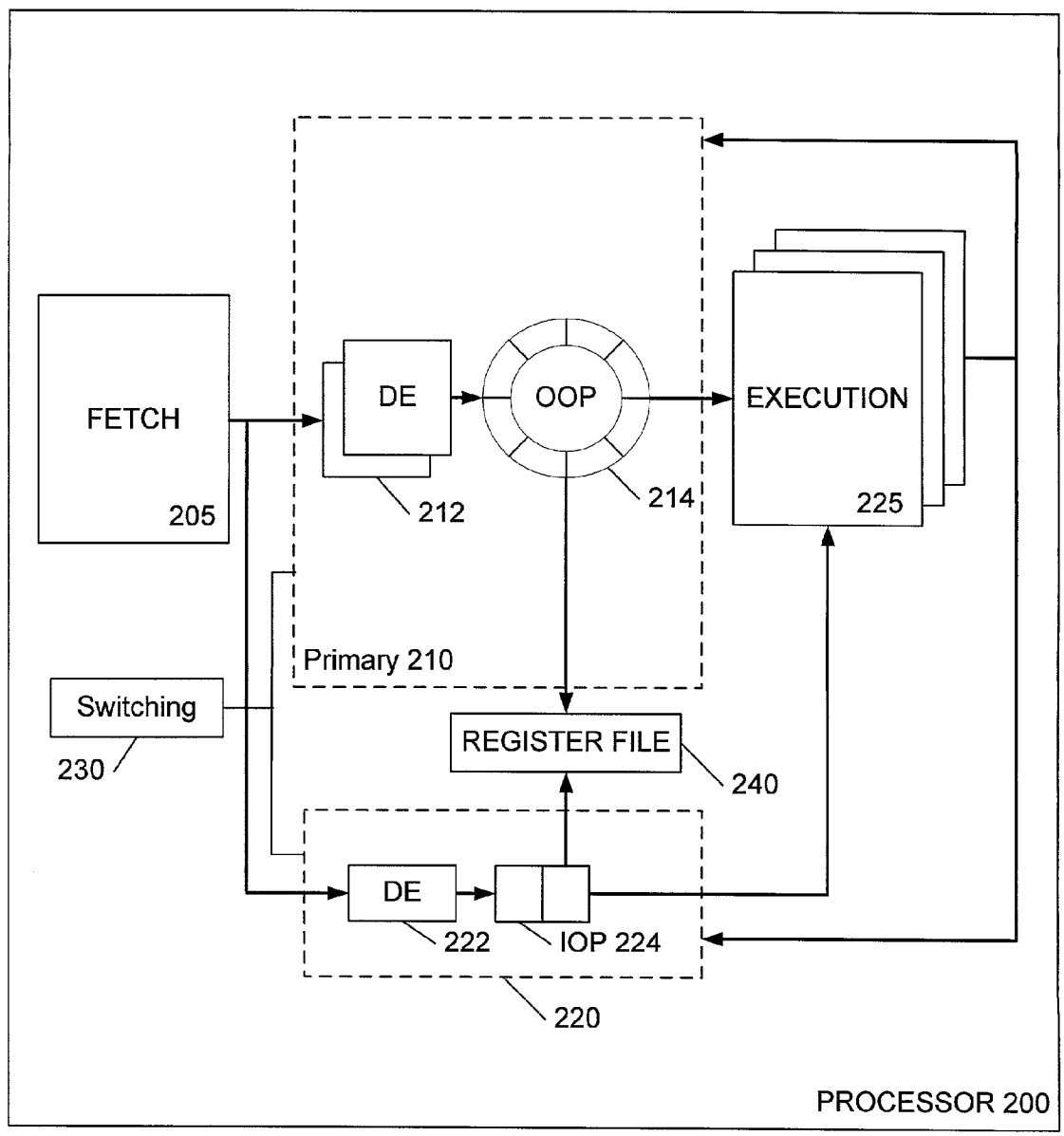
FIG. 2 illustrates an embodiment of a processor having asymmetric secondary pipeline segments.

As a more specific example, FIG. 2 illustrates an embodiment of a processor 200 having asymmetric and at least partially functionally duplicative primary and secondary pipeline segments. The primary structure 210 includes wide superscalar pipelines with multiple-issue capabilities. In particular, the primary structure 210 includes multiple decoders 212 and reservation station/re-order buffer pairs 214 capable of executing instructions in an out-of-order fashion. This structure is designed for performance, and therefore, its configuration is complex. On the contrary, the secondary structure 220 comprises a single decoder 222 and a two entry first-in-first-out (FIFO) type instruction queue 224 that feeds the execution units. The instruction queue 224 works like a two entry reservation station/re-order buffer that issues instructions in program order. Therefore the primary structure 210 includes a complex decoder 212 pipeline segment and an out-of-order pipeline (OOP) segment, whereas the secondary structure includes a simple decoder 222 pipeline segment and an in-order pipeline (IOP) segment.

In the embodiment of FIG. 2, the primary and secondary structures cooperate with shared resources to process instructions. A register file 240 may be written to or read from by either the primary or the secondary pipeline. Additionally, a set of execution units 225 may be used to execute the various instructions dispatched by the primary and secondary pipelines. On the front end, a single fetch unit 205 may feed both the primary and secondary pipelines. Finally, switching logic 230 controls which pipeline is active.

Under normal operation (e.g., the die temperature is below a given threshold), the wide superscalar pipelines provide the instructions for the execution units, just like a typical high-performance microprocessor. The Operating System (OS) may schedule some "easy" tasks to the secondary pipeline as well in some embodiments. Once the temperature exceeds a selected threshold, or if the processor is switched to a low power mobile mode, the cooler secondary pipeline is used exclusively, and the primary pipeline is disabled (e.g., by clock gating).

Figure 3:
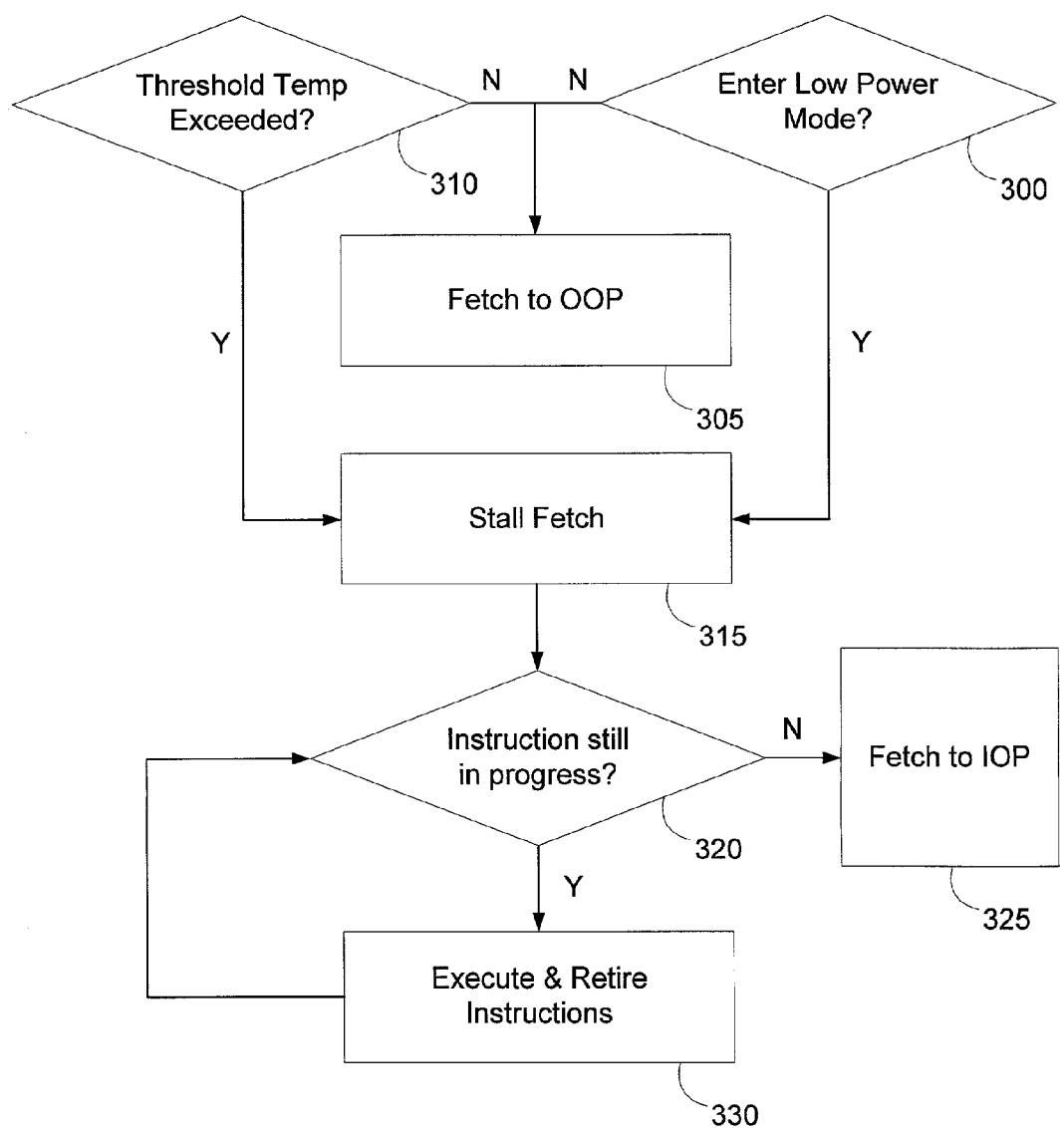
FIG. 3 is a flow diagram illustrating a technique to reduce power consumption for one embodiment by utilizing duplicative but more power efficient resources to perform processing.

FIG. 3 shows a transition process for the embodiment of FIG. 2. In block 300, whether the low power mobile mode is to be entered is determined. A user event may signify that the low power mode should be entered. For example, a user may close a lid of a laptop, press a button or hot key, or select a program or operating system option that causes entry into the low power mode. Similarly, whether a threshold temperature is exceeded is determined in block 310. If neither one of these conditions is true, then fetching of instructions to the out-of-order pipeline continues as indicated in block 305. Other embodiments may test only one or the other of these conditions, or may test other conditions, such as a composite power or temperature measurement, etc.

If either one of these conditions is true (or if any condition is true which justifies switching to only the in-order pipeline), then a fetch stall is generated to stall fetching of instructions as indicated in block 315. If instructions remain in the out-of-order pipeline (as determined in block 320), the instructions are executed and retired as indicated in block 330. The fetch unit may remain stalled until all the remaining instructions in the out-of-order pipeline are executed and retired. Once this process is completed, the fetch unit 205 is restarted, and instructions are fetched to the in-order pipeline as indicated in block 325.

In some embodiments, the fetch unit 205 may also be a great consumer of power when operating at full speed. In one embodiment, the fetch unit 205 may be split into primary and secondary resources to alleviate the high power consumption issue by utilizing the secondary resource at times. In another embodiment, the fetch unit 205 may be operated in a low power mode when the overall low power mode that directs execution to the secondary pipeline is entered. For example, the clocks to the fetch unit 205 may be gated a portion of the time or periodically.

Figure 4:
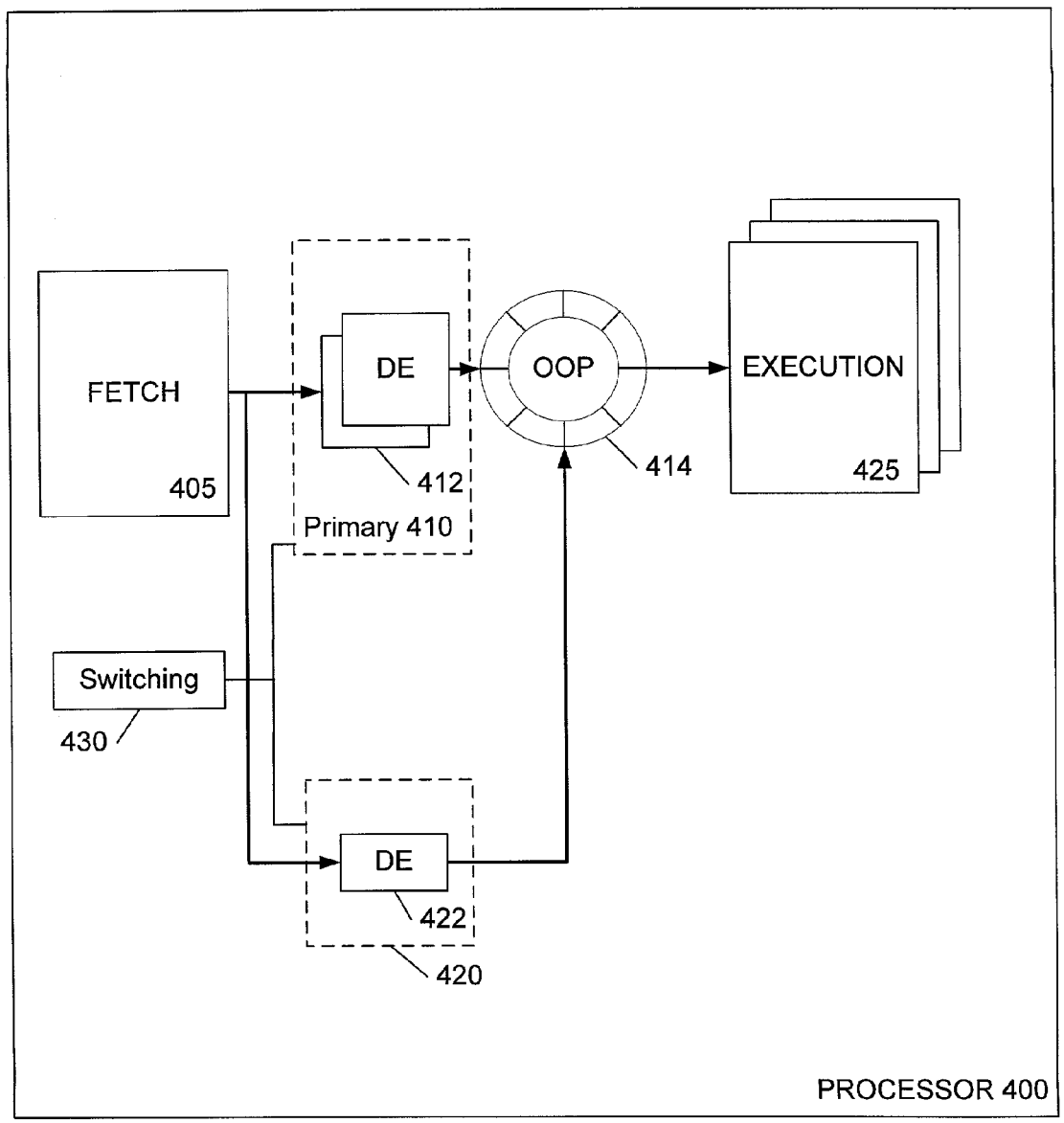
FIG. 4 illustrates an embodiment with a decode segment of a pipeline being split into two asymmetric execution resources.

FIG. 4 illustrates another embodiment that utilizes asymmetric secondary resources. In this embodiment, a processor 400 has only a single pipeline segment that is duplicated, the decoder. A primary structure 410 includes a multiple instruction decoder 412, whereas a secondary and lower power structure 420 includes a single decoder 422. In this embodiment, a fetch unit 405 provides instructions to either (or both of in some cases) the decoders 412 and 422. Both decoders 412 and 422 feed decoded instructions into the out-of-order pipeline segment 414, which passes instructions to a set of execution units 425. Again, switching logic 430 switches which decoder(s) are active at a given time. In other embodiments, other pipeline segments than decoders may also be isolated and duplicated if those pipeline segments indeed prove to use large amounts of power. Moreover, execution units may be arranged as duplicative primary and secondary resources. Execution units may be selected by throughput based on temperature or operating mode in accordance with these general techniques.

Figure 5:
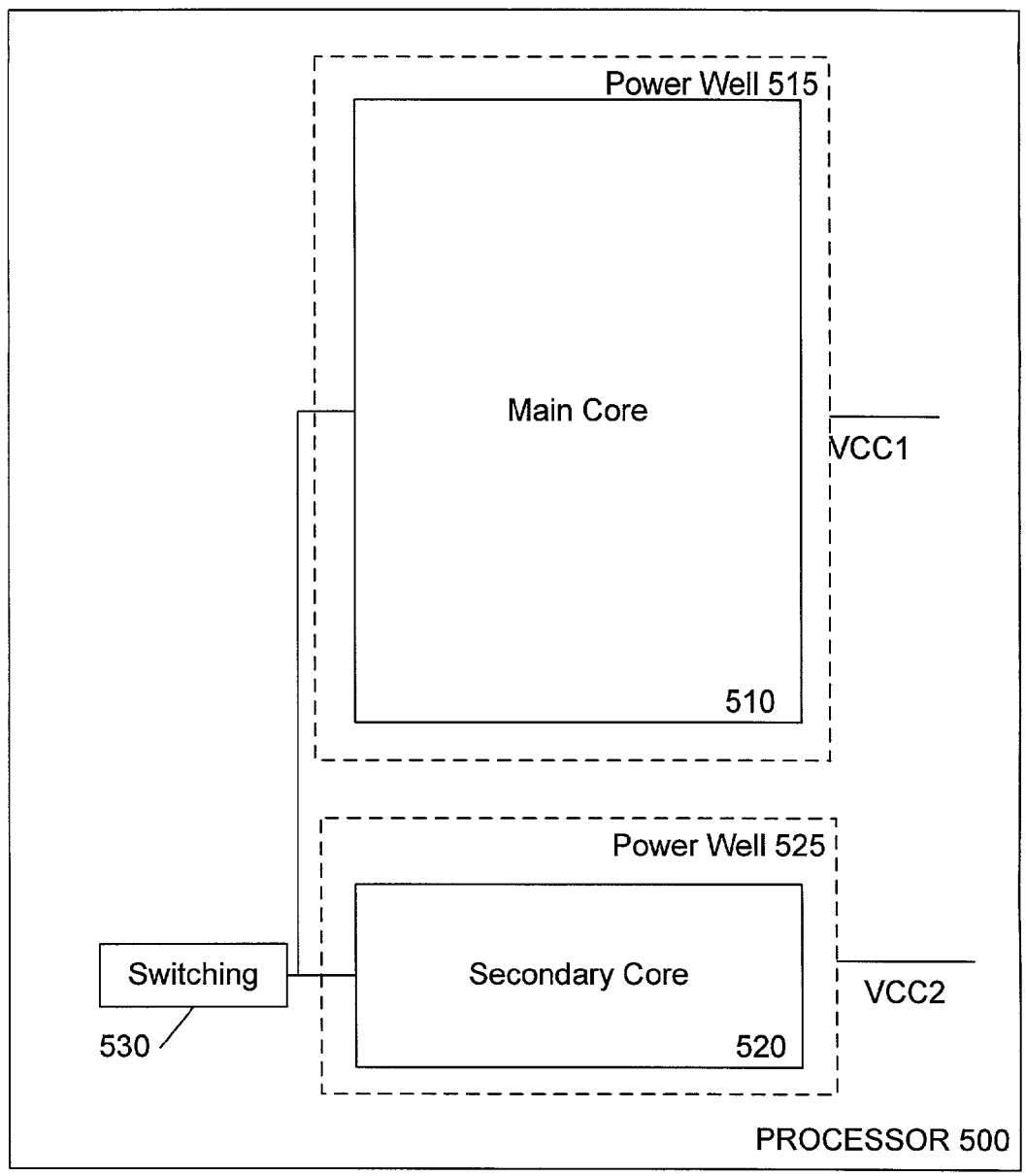
FIG. 5 illustrates an embodiment in which the functionality of an entire processor core is replicated in an asymmetric fashion.

FIG. 5 illustrates yet another embodiment in which the processing resource that is duplicated is a full processor core capable of running an instruction set. In the embodiment of FIG. 5, a processor 500 includes a main core 510 and a secondary core 520 which may be independently used or used in concert as previously described under control of switching logic 530. In this embodiment, the main core 510 is in a first power well 515 of an integrated circuit and is powered by a first voltage supply as shown by a VCC1 supply being coupled to the main core 510 on a VCC1 power supply line. The secondary core 520 is disposed in a second power well 525 and powered by a second power supply VCC2 on a VCC2 power supply line. In this embodiment, power may be removed from a power well when that core is not active. For example, in a low power consumption mode, the main core 510 may be disabled, and VCC1 may be removed from the core. The secondary core may continue processing instructions so that normal (albeit slower) function is maintained. The use of independent power wells may be particularly advantageous where leakage current would otherwise be large, making an option of simply gating the clocks to the main core 510 less attractive. In other embodiments, other primary and secondary resources previously discussed may similarly be isolated in different power wells to obtain similar advantages.

In some embodiments, both cores may be fully compatible (i.e., fully decode and execute an entire instruction set). In other embodiments, the secondary core 520 may only be capable of processing a subset of the entire instruction set. In such a case, a programmer or compiler may be responsible for ensuring that tasks to be executed by the secondary core 520 do not include unsupported instructions. In one embodiment, the secondary core may not include support for instructions such as floating point or single instruction multiple data (SIMD) instructions. The switching logic 530 may detect such instructions and force a switch back to the main core 510 if they occur. However, it may be possible to run various minimal connectivity programs (e.g., email or other messaging programs) without using some complex or compute-intensive instructions. In such cases, it may be advantageous to have a core that executes only a subset of an instruction set and to carefully architect routines to run on that core in a low power consumption mode.

Figure 6:
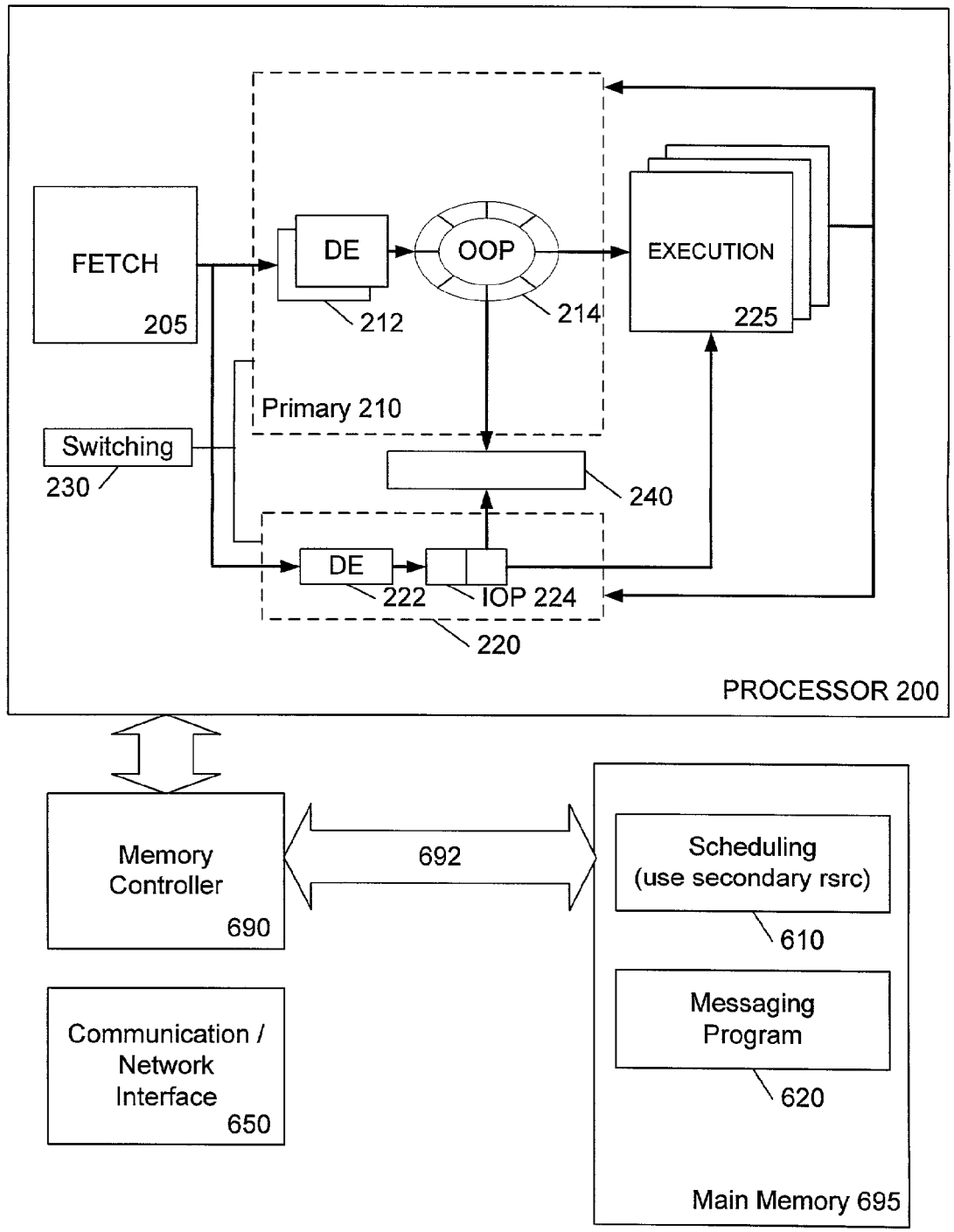
FIG. 6 illustrates an embodiment of a system that utilizes a processor having asymmetric secondary processing resources.

FIG. 6 illustrates one embodiment of a system utilizing a processor having asymmetric secondary resources. In the embodiment of FIG. 6, the processor 200 from FIG. 2 is shown; however, other embodiments as discussed may be used in this or other system arrangements. In the embodiment of FIG. 6, a memory controller 690 is coupled to the processor 200, and a main memory 695 is coupled to the memory controller 690 by a bus 692. Also included in the system are a communication and/or network interface 650, and a message indicator 655. The message indicator and the communications and/or network interface 650 are coupled to the processor such that programs executed by the processor can utilize these devices. Many different system configurations are possible, and the particular configuration used is not particularly important. Moreover, various components in the system may be integrated together, rearranged, coupled together in different ways, etc.

In one embodiment, the main memory 695 of FIG. 6 includes a scheduling routine 610 such as a scheduler in an operating system. The scheduling routine 610 is aware that the processor 200 includes a secondary resource (i.e., secondary structure 220). Therefore, the scheduling routine 610 selects tasks to execute on the secondary pipeline. In some cases, relatively simple and/or latency-insensitive tasks are selected.

In one embodiment, the main memory 695 of FIG. 6 includes a messaging program 620. The messaging program 620 may be an email program, an instant messenger program, a pager program, a phone call program, or any messaging program. In some cases, it is desirable to allow the system to enter a very low power mode in which the system is not being used by the user, however, the user wishes to be alerted if a message is received. In this case, the primary resources (e.g., the out-of-order pipeline) may be shut down, and the in-order-pipeline may be used to continue to monitor the communication/networking interface 650 according to the messaging program 620. If a message is received, the processor may generate a message indication via the message indicator 655. The message indicator 655 may be anything from an audio device that generates an audible sound, to a light emitting diode that lights up or changes flashing frequency, etc., to a display that changes in response to the message being received.

A typical hardware design may go through various stages, from creation to simulation to fabrication. Data representing a design may represent the design in a number of manners. First, as is useful in simulations, the hardware may be represented using a hardware description language or another functional description language Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. In a software design, the design typically remains on a machine readable medium. An optical or electrical wave modulated or otherwise generated to transmit such information, a memory, or a magnetic or optical storage such as a disc may be the machine readable medium. Any of these mediums may "carry" the design information. A processing device utilizing disclosed techniques may be represented in these or other manners and accordingly may be carried in various media.

Thus, a processing system having asymmetric secondary processing resources is disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. An apparatus comprising:
   a first processor pipeline segment;
   a second processor pipeline segment, said second processor pipeline segment being a simple processor pipeline segment relative to said first processor pipeline segment, wherein said first processor pipeline segment comprises an out-of-order pipeline segment and wherein said second processor pipeline segment comprises an in-order pipeline segment;
   pipeline switch logic to switch execution from said first processor pipeline segment in a first mode to said second processor pipeline segment in a low power consumption mode; and
   a fetch mechanism to fetch instructions for both said first processor pipeline segment and said second processor pipeline segment, wherein said fetch mechanism comprises an adaptive fetch mechanism to operate in a reduced power consumption fetching mode when said apparatus is in said low power consumption mode and is clock gated in said reduced power consumption fetching mode.

2. The apparatus of claim 1 further comprising:
   a primary decoder to decode instructions for said first processor pipeline segment;
   a secondary decoder to decode instructions for said second processor pipeline segment.

3. The apparatus of claim 1 further comprising:
   a register file accessible by both said first processor pipeline segment and said second processor pipeline segment;
   a plurality of execution units shared by said first processor pipeline segment and said second processor pipeline segment.

4. The apparatus of claim 3 wherein said second processor pipeline segment further comprises:
   a first-in-first-out instruction queue.

5. The apparatus of claim 1 wherein said pipeline switch logic is to switch from only execution in said first processor pipeline segment in said first mode to only execution in said second processor pipeline segment in said low power consumption mode.

6. The apparatus of claim 1 wherein said pipeline switch logic is to switch from execution in said first processor pipeline segment and optionally said second processor pipeline segment in said first mode to only execution in said second processor pipeline segment in said low power consumption mode.

7. The apparatus of claim 1 wherein said pipeline switch logic is to switch to said low power consumption mode in response to a temperature indicator for said apparatus reaching a selected level.

8. The apparatus of claim 1 wherein said pipeline switch logic is to switch to a limited responsiveness state in response to a user generated event.

9. The apparatus of claim 8 wherein in said limited responsiveness state, said apparatus is to detect incoming messages from a communications interface.

10. The apparatus of claim 1 wherein said secondary processor pipeline segment is an isolated pipeline segment having a separate power supply from said first processor pipeline segment.

11. The apparatus of claim 10 wherein said secondary processor pipeline segment comprises an in-order processor pipeline segment.

12. The apparatus of claim 1 wherein said pipeline switch logic is to execute a plurality of in progress instructions in said first processor pipeline segment until said plurality of in progress instructions retire and then to switch to said second processor pipeline segment when transitioning to said low power consumption mode.

13. A method comprising:
   executing instructions via a first execution resource in a first mode, wherein said first execution resource is a first pipeline segment;
   transitioning to a low power mode;
   executing instructions via a second execution resource in the low power mode, wherein said second execution resource is a second pipeline segment, wherein said second pipeline segment is an in-order pipeline segment and said first pipeline segment is an out-of-order pipeline segment;
   fetching instructions for both pipeline segments via a fetch unit;
   reducing power consumption of said fetch unit in said low power mode; and
   sharing a plurality of registers and execution units between said first pipeline segment and said second pipeline segment.

14. The method of claim 13 further comprising:
decoding instructions for said first pipeline segment with a complex decoder;
decoding instructions for said second pipeline segment with a simple decoder relative to said complex decoder.

15. The method of claim 13 wherein transitioning comprises:
retiring a plurality of in-progress instructions.

16. The method of claim 13 further comprising:
removing a power supply from said first execution resource when operating in said low power mode.

17. The method of claim 16 wherein said first execution resource is a first execution core having a first power supply line and wherein said second execution resource is a second execution resource having a second power supply line.

18. A processor comprising:
an in-order pipeline segment;
an out-of-order-pipeline segment;
a plurality of registers accessible by both the in-order pipeline segment and said out-of-order pipeline segment;
a fetch unit to fetch in a first mode for said in-order pipeline segment and to fetch in a second mode for said out-of-order pipeline segment, wherein said wherein said fetch mechanism comprises an adaptive fetch mechanism to operate in a reduced power consumption fetching mode when said apparatus is in said low power consumption mode; and
a plurality of shared execution units operative in response to instructions processed by said in-order pipeline segment and said out-of-order pipeline segment.

19. The processor of claim 18 further comprising:
a complex decoder to decode instructions for said out-of-order pipeline segment;
a simple decoder to decode instructions for said in-order pipeline segment.

20. The processor of claim 18 wherein said out-of-order pipeline segment is to be disabled in a low power consumption mode.

21. The processor of claim 20 wherein said low power consumption mode is a messaging connect mode.

22. The processor of claim 18 wherein said low power consumption mode is to be entered in response to a high temperature.

23. An apparatus comprising:
a first processor pipeline segment;
a second processor pipeline segment, said second processor pipeline segment being a simple processor pipeline segment relative to said first processor pipeline segment, wherein said first processor pipeline segment comprises an out-of-order pipeline segment and wherein said second processor pipeline segment comprises an in-order pipeline segment;
pipeline switch logic to switch execution from said first processor pipeline segment in a first mode to said second processor pipeline segment in a low power consumption mode;
a fetch mechanism to fetch instructions for both said first processor pipeline segment and said second processor pipeline segment, wherein said fetch mechanism comprises an adaptive fetch mechanism to operate in a reduced power consumption fetching mode when said apparatus is in said low power consumption mode;
a register file accessible by both said first processor pipeline segment and said second processor pipeline segment; and
a plurality of execution units shared by said first processor pipeline segment and said second processor pipeline segment.

24. The apparatus of claim 23 wherein said fetch mechanism is clock gated in said reduced power consumption fetching mode.

25. The apparatus of claim 23 further comprising:
a primary decoder to decode instructions for said first processor pipeline segment;
a secondary decoder to decode instructions for said second processor pipeline segment.

26. The apparatus of claim 23 wherein said second processor pipeline segment further comprises:
a first-in-first-out instruction queue.

27. The apparatus of claim 23 wherein said pipeline switch logic is to switch from only execution in said first processor pipeline segment in said first mode to only execution in said second processor pipeline segment in said low power consumption mode.

28. The apparatus of claim 23 wherein said pipeline switch logic is to switch from execution in said first processor pipeline segment and optionally said second processor pipeline segment in said first mode to only execution in said second processor pipeline segment in said low power consumption mode.

29. The apparatus of claim 23 wherein said pipeline switch logic is to switch to said low power consumption mode in response to a temperature indicator for said apparatus reaching a selected level.

30. The apparatus of claim 23 wherein said pipeline switch logic is to switch to a limited responsiveness state in response to a user generated event.

31. The apparatus of claim 30 wherein in said limited responsiveness state, said apparatus is to detect incoming messages from a communications interface.

32. The apparatus of claim 23 wherein said secondary processor pipeline segment is an isolated pipeline segment having a separate power supply from said first processor pipeline segment.

33. The apparatus of claim 32 wherein said secondary processor pipeline segment comprises an in-order processor pipeline segment.

34. The apparatus of claim 23 wherein said pipeline switch logic is to execute a plurality of in progress instructions in said first processor pipeline segment until said plurality of in progress instructions retire and then to switch to said second processor pipeline segment when transitioning to said low power consumption mode.

35. An apparatus comprising:
a first processor pipeline segment;
a second processor pipeline segment, said second processor pipeline segment being a simple processor pipeline segment relative to said first processor pipeline segment, wherein said first processor pipeline segment comprises an out-of-order pipeline segment and wherein said second processor pipeline segment comprises an in-order pipeline segment;
pipeline switch logic to switch execution from said first processor pipeline segment in a first mode to said second processor pipeline segment in a low power consumption mode, wherein said pipeline switch logic is to switch from execution in said first processor pipeline segment and optionally said second processor pipeline segment in said first mode to only execution in said second processor pipeline segment in said low power consumption mode;

a fetch mechanism to fetch instructions for both said first processor pipeline segment and said second processor pipeline segment, wherein said fetch mechanism comprises an adaptive fetch mechanism to operate in a reduced power consumption fetching mode when said apparatus is in said low power consumption mode.

36. The apparatus of claim 35 wherein said fetch mechanism is clock gated in said reduced power consumption fetching mode.

37. The apparatus of claim 35 further comprising:
a primary decoder to decode instructions for said first processor pipeline segment;
a secondary decoder to decode instructions for said second processor pipeline segment.

38. The apparatus of claim 35 further comprising:
a register file accessible by both said first processor pipeline segment and said second processor pipeline segment;
a plurality of execution units shared by said first processor pipeline segment and said second processor pipeline segment.

39. The apparatus of claim 35 wherein said second processor pipeline segment further comprises:
a first-in-first-out instruction queue.

40. The apparatus of claim 35 wherein said pipeline switch logic is to switch from only execution in said first processor pipeline segment in said first mode to only execution in said second processor pipeline segment in said low power consumption mode.

41. The apparatus of claim 35 wherein said pipeline switch logic is to switch to said low power consumption mode in response to a temperature indicator for said apparatus reaching a selected level.

42. The apparatus of claim 35 wherein said pipeline switch logic is to switch to a limited responsiveness state in response to a user generated event.

43. The apparatus of claim 42 wherein in said limited responsiveness state, said apparatus is to detect incoming messages from a communications interface.

44. The apparatus of claim 35 wherein said secondary processor pipeline segment is an isolated pipeline segment having a separate power supply from said first processor pipeline segment.

45. The apparatus of claim 44 wherein said secondary processor pipeline segment comprises an in-order processor pipeline segment.

46. The apparatus of claim 35 wherein said pipeline switch logic is to execute a plurality of in progress instructions in said first processor pipeline segment until said plurality of in progress instructions retire and then to switch to said second processor pipeline segment when transitioning to said low power consumption mode.

* * * * *